United States Patent
Holmes et al.

(10) Patent No.: US 9,248,528 B2
(45) Date of Patent: Feb. 2, 2016

(54) SYSTEM AND METHOD FOR MODIFYING A ROTOR

(71) Applicant: General Electric Company, Schenectady, NY (US)

(72) Inventors: James Bradford Holmes, Fountain Inn, SC (US); John William Herbold, Fountain Inn, SC (US); Jason Matthew Clark, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 350 days.

(21) Appl. No.: 13/847,660

(22) Filed: Mar. 20, 2013

(65) Prior Publication Data
US 2013/0205589 A1  Aug. 15, 2013

Related U.S. Application Data

(62) Division of application No. 13/220,997, filed on Aug. 30, 2011, now Pat. No. 8,402,625.

(51) Int. Cl.
| B23P 6/00 | (2006.01) |
|---|---|
| B23B 47/28 | (2006.01) |
| B23B 41/00 | (2006.01) |
| F01D 5/00 | (2006.01) |
| F01D 5/30 | (2006.01) |
| F01D 25/28 | (2006.01) |

(52) U.S. Cl.
CPC .............. B23P 6/002 (2013.01); B23B 41/00 (2013.01); B23B 47/281 (2013.01); F01D 5/005 (2013.01); B23B 2215/76 (2013.01); B23B 2260/03 (2013.01); F01D 5/3007 (2013.01); F01D 25/285 (2013.01); Y10T 29/49318 (2015.01); Y10T 29/49325 (2015.01); Y10T 29/53974 (2015.01); Y10T 29/53983 (2015.01); Y10T 408/563 (2015.01); Y10T 408/6779 (2015.01); Y10T 408/96 (2015.01)

(58) Field of Classification Search
CPC ....... B23P 6/002; B23B 47/281; B23B 41/00; B23B 2215/76; B23B 2260/03; F01D 5/005; Y10T 29/49318; Y10T 29/49325; Y10T 29/53983; Y10T 29/53974; Y10T 408/6779; Y10T 408/96; Y10T 408/563
See application file for complete search history.

(56) References Cited

U.S. PATENT DOCUMENTS

| 3,663,115 | A | * | 5/1972 | Vindez et al. ................... 408/79 |
|---|---|---|---|---|
| 4,820,092 | A | | 4/1989 | Mueller et al. |
| 5,161,291 | A | * | 11/1992 | Guenther ....................... 29/56.5 |
| 5,168,608 | A | | 12/1992 | Fraser et al. |
| 5,284,406 | A | | 2/1994 | Mueller et al. |
| 2009/0077795 | A1 | | 3/2009 | Prince et al. |
| 2009/0144958 | A1 | | 6/2009 | Ahti et al. |
| 2009/0265908 | A1 | * | 10/2009 | Corn ..................... F01D 25/285 |
| | | | | 29/426.1 |

FOREIGN PATENT DOCUMENTS

EP  0486131 A2  5/1992

* cited by examiner

*Primary Examiner* — Ryan J Walters
(74) *Attorney, Agent, or Firm* — Dority & Manning, PA

(57) ABSTRACT

A system for modifying a slot in a rotor includes a drill, a clamp connected to the drill and configured to engage with an interior surface of the slot, and means for supporting the drill from a stationary platform adjacent to the rotor. A method for modifying a slot in a rotor includes connecting a coupling to a stationary platform adjacent to the rotor, connecting a drill to the coupling, and locating the drill proximate to the slot. The method further includes inserting a clamp into the slot, engaging the clamp with an interior surface of the slot, and operating the drill to create a cavity in the slot.

9 Claims, 15 Drawing Sheets

SYSTEM AND METHOD FOR MODIFYING A ROTOR

RELATED APPLICATIONS

The present application is a divisional application of U.S. application Ser. No. 13/220,997, filed on Aug. 30, 2011, which is incorporated herein in its entirety by reference thereto for all purposes. Any disclaimer that may have occurred during prosecution of the above-referenced application(s) is hereby expressly rescinded.

FIELD OF THE INVENTION

The present invention generally involves a system and method for modifying a rotor. In particular, embodiments of the present invention provide a system and method for creating a cavity in a slot in the rotor.

BACKGROUND OF THE INVENTION

Various foams of commercial equipment include rotating components. For example, a typical gas turbine includes an axial compressor at the front, one or more combustors around the middle, and a turbine at the rear. The compressor generally includes a casing that surrounds and encloses alternating stages of circumferentially mounted stator vanes and rotating blades. The stator vanes typically attach to the casing, and the rotating blades typically attach to a rotor inside the compressor. Ambient air enters the compressor, and each stage of stator vanes directs the airflow onto the following stage of rotating blades to progressively impart kinetic energy to the working fluid (air) to bring it to a highly energized state. The working fluid exits the compressor and flows to the combustors where it mixes with fuel and ignites to generate combustion gases having a high temperature and pressure. The combustion gases exit the combustors and flow to the turbine where they expand to produce work. For example, expansion of the combustion gases in the turbine may rotate a shaft connected to a generator to produce electricity.

The rotating blades in the compressor typically connect to the rotor in a manner that allows the rotating blades to be periodically removed for maintenance, inspections, and/or replacement. For example, the rotating blades may include a root or base that slides into a complementary dovetail slot in the rotor. The complementary surfaces between the root and the dovetail slot prevent each blade from moving radially, and the area on the rotor surrounding the slot may be "staked" or plastically deformed to prevent the root from moving axially in the slot. In this manner, each rotating blade may be removed from the rotor, and the same or a replacement blade may be re-inserted into the dovetail slot before the rotor is re-staked to hold the blade in place.

The area on the surface of the rotor suitable for staking the blade is finite and will therefore permit removal and re-staking of the blade a limited number of times. As a result, various systems and methods have been developed to modify the rotor to permit the blades to be removed and re-staked multiple times. For example, U.S. Patent Publication 2009/0077795, assigned to the same assignee as the present application, describes a system and method in which a drill is used to create a recess in the bottom of the slot. An insert may then be placed in the recess and staked to hold the blade axially in place. In the event that the blade must be removed from the rotor again, a new insert may be used to again stake the blade axially in place.

The modification to the slot in the rotor typically requires substantial disassembly of the compressor and associated equipment to provide suitable access to the rotor. For example, the easing surrounding the rotating blades is often completely removed, and scaffolding is erected around the rotor to support the equipment and personnel performing the modification. In addition, the gas turbine itself may be situated in a building having walls and/or a roof that must be removed or otherwise opened to provide sufficient access to the rotor. This disassembly and staging is expensive to perform, extends the time needed for the rotor modification, and increases the outage associated with the modification. Therefore, an improved system and method for modifying the slot in the rotor that reduces the amount of disassembly of the compressor and staging would be useful.

BRIEF DESCRIPTION OF THE INVENTION

Aspects and advantages of the invention are set forth below in the following description, or may be obvious from the description, or may be learned through practice of the invention.

One embodiment of the present invention is a system for modifying a slot in a rotor. The system includes a drill, a clamp connected to the drill and configured to engage with an interior surface of the slot, and means for supporting the drill from a stationary platform adjacent to the rotor.

Another embodiment of the present invention is a system for modifying a slot in a rotor. The system includes a drill and a coupling having a first end connected to the drill and a second end connected to a stationary platform adjacent to the rotor.

The present invention may also include a method for modifying a slot in a rotor. The method includes connecting a coupling to a stationary platform adjacent to the rotor, connecting a drill to the coupling, and locating the drill proximate to the slot. The method further includes inserting a clamp into the slot, engaging the clamp with an interior surface of the slot, and operating the drill to create a cavity in the slot.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
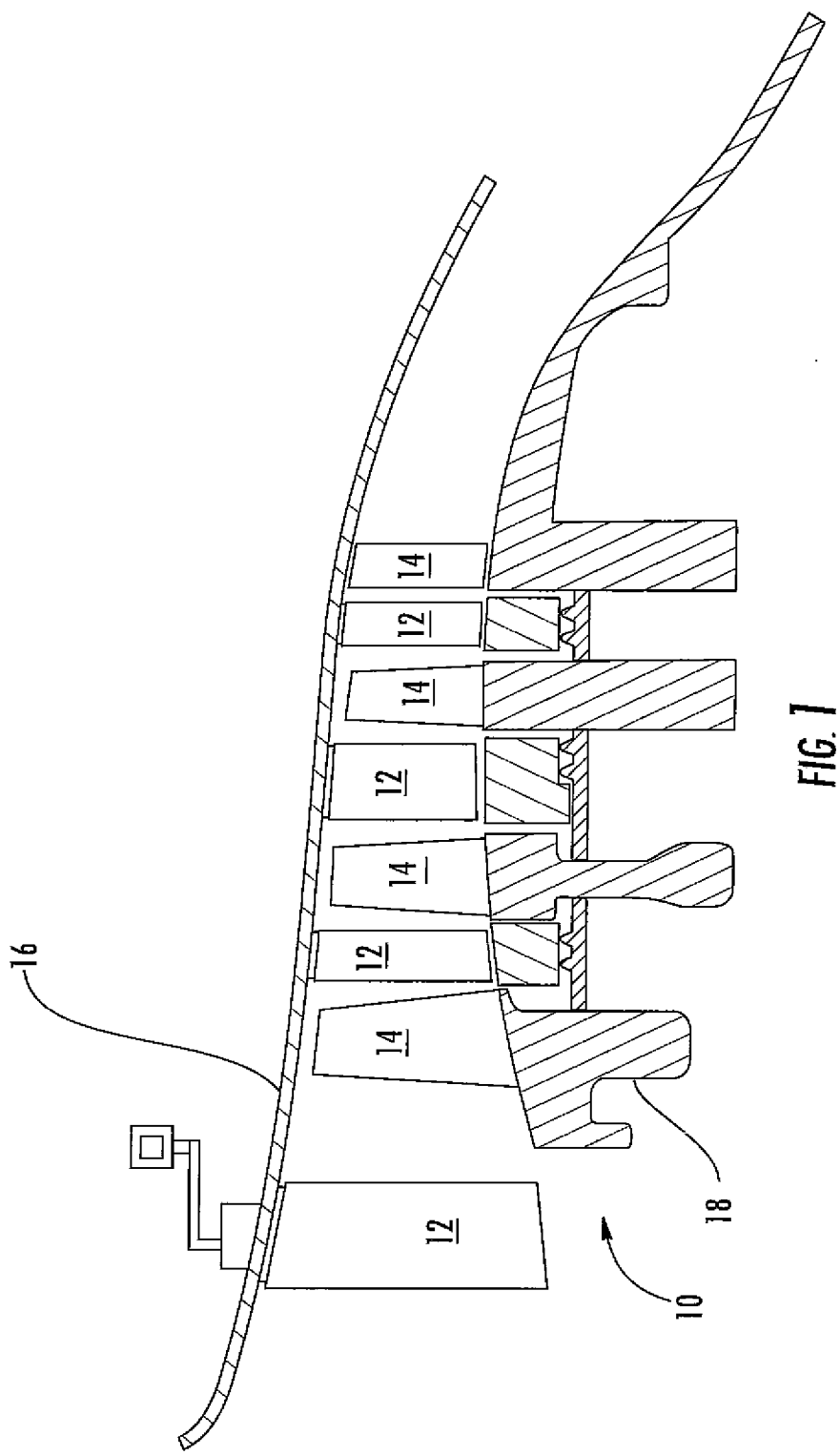
FIG. 1 is a cross sectional view of an exemplary compressor.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide an improved system and method for modifying a rotor. The system generally includes an assembly that locates or positions a drill on the rotor in the radial space previously occupied by a removed blade, allowing the modification to be performed without requiring complete removal of a casing or any walls or other structures surrounding the rotor. In particular embodiments, the assembly may include means for supporting the drill from a stationary platform adjacent to the rotor and/or a coupling having a first end connected to the drill and a second end connected to the stationary platform. Alternately, or in addition, the assembly may include one or more sliding and/or pivotal connections that allow the assembly to manipulate the drill in multiple planes so that the modification may be precisely and repeatably performed in the confined space. Although various embodiments of the present invention will be described in the context of a rotor included in a compressor, one of ordinary skill in the art will readily appreciate that the teachings of the present invention are not limited to a compressor rotor and may be equally applied to a rotor in other forms of rotating equipment.

FIG. 1 provides a cross sectional view of an exemplary compressor 10 to illustrate various embodiments of the present invention. The compressor 10 generally includes alternating stages of stator vanes 12 and rotating blades 14 as is known in the art. The first stage of stator vanes 12 is commonly referred to as the inlet guide vane and may be adjustable to vary the amount or volume of air flow through the compressor 10. Each stage of stator vanes 12 and rotating blades 14 generally comprises a plurality of circumferentially arranged airfoils, with the stator vanes 12 attached to a casing 16 surrounding the compressor 10 and the rotating blades 14 attached to a rotor 18 generally aligned with an axial centerline of the compressor 10. In this manner, the stator vanes 12 direct the airflow entering the compressor 10 onto the following stage of rotating blades 14 to progressively impart kinetic energy to the working fluid (air) to bring it to a highly energized state.

Figure 2:
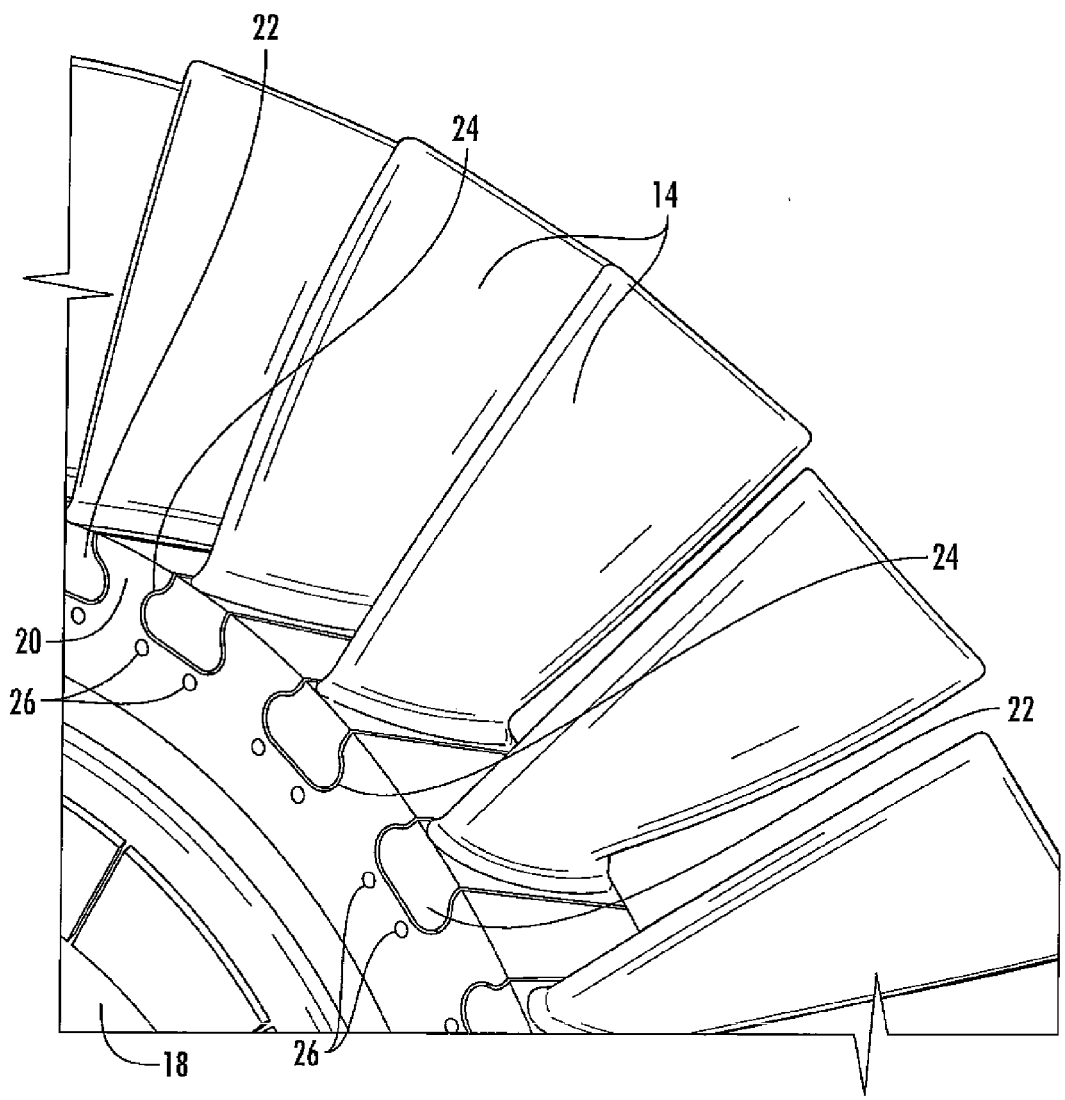
FIG. 2 is an enlarged perspective view of a portion of a first stage of rotating blades in the compressor shown in FIG. 1.

FIG. 2 provides an enlarged perspective view of a portion of a first stage of rotating blades 14 in the compressor 10. As shown, the rotating blades 14 extend radially from a rim 20 of the rotor 18. Each blade 14 generally includes a root 22 that slides into a slot 24 in the rim 20, and the complementary surfaces between the root 22 and the slot 24 prevent each blade 14 from moving radially. In addition, the rim 20 of the rotor 18 may be "staked" or plastically deformed, producing the characteristic stake marks 26 shown in FIG. 2, to prevent the root 22 from moving axially in the slot 24.

Figure 3:
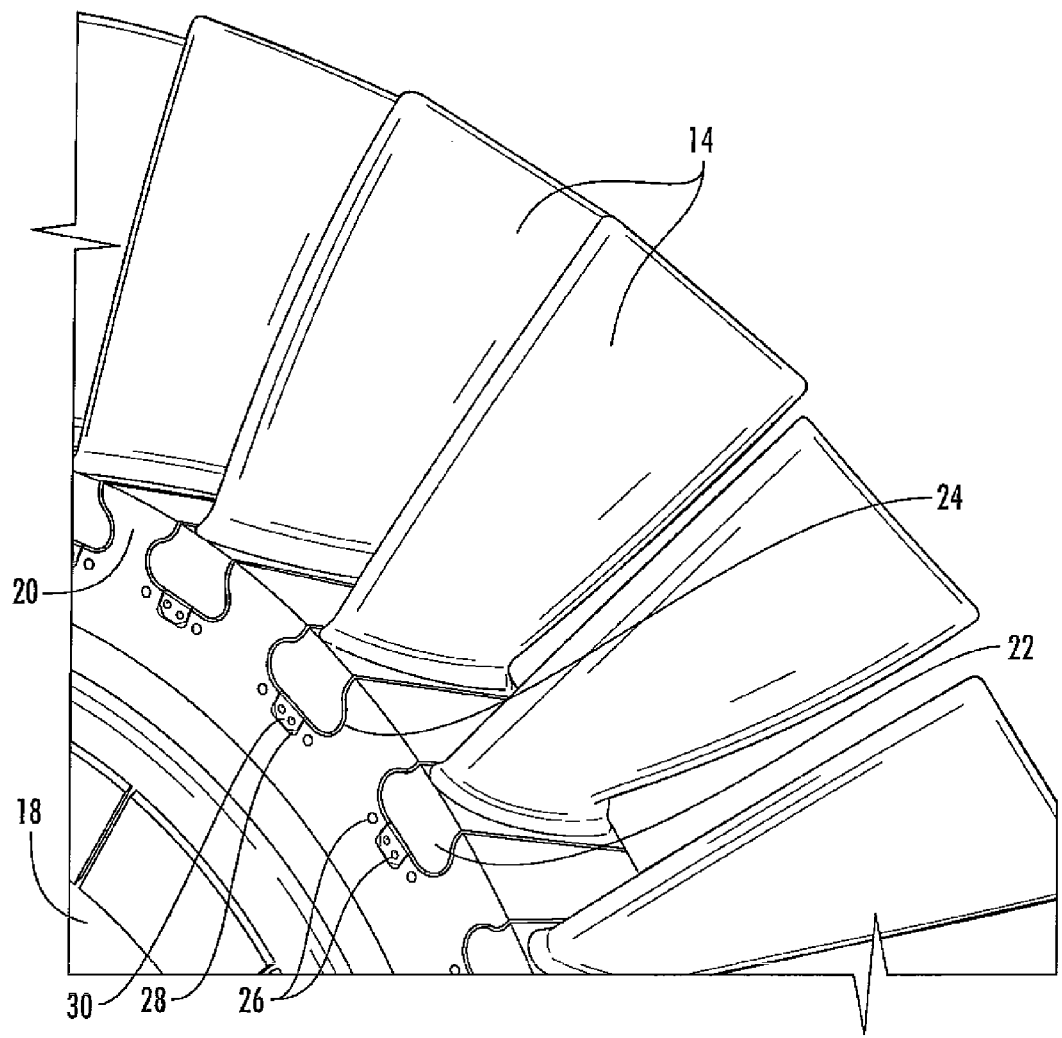
FIG. 3 is an enlarged perspective view of the first stage of rotating blades shown in FIG. 2 after being modified with an embodiment of the present invention.

FIG. 3 provides an enlarged perspective view of the first stage of rotating blades 14 shown in FIG. 2 after being modified with an embodiment of the present invention. As shown, a portion of the rim 20 has been machined to form a cavity 28 in the slot 24. An insert 30 or biscuit has been placed in the cavity 28 and staked to axially restrain the root 22 in the slot 24. In this manner, each rotating blade 14 may be repeatedly removed from the rotor 18, and a new insert 30 may be placed in the cavity 28 to stake the rotating blade 14 in place once reinstalled.

Figure 4:
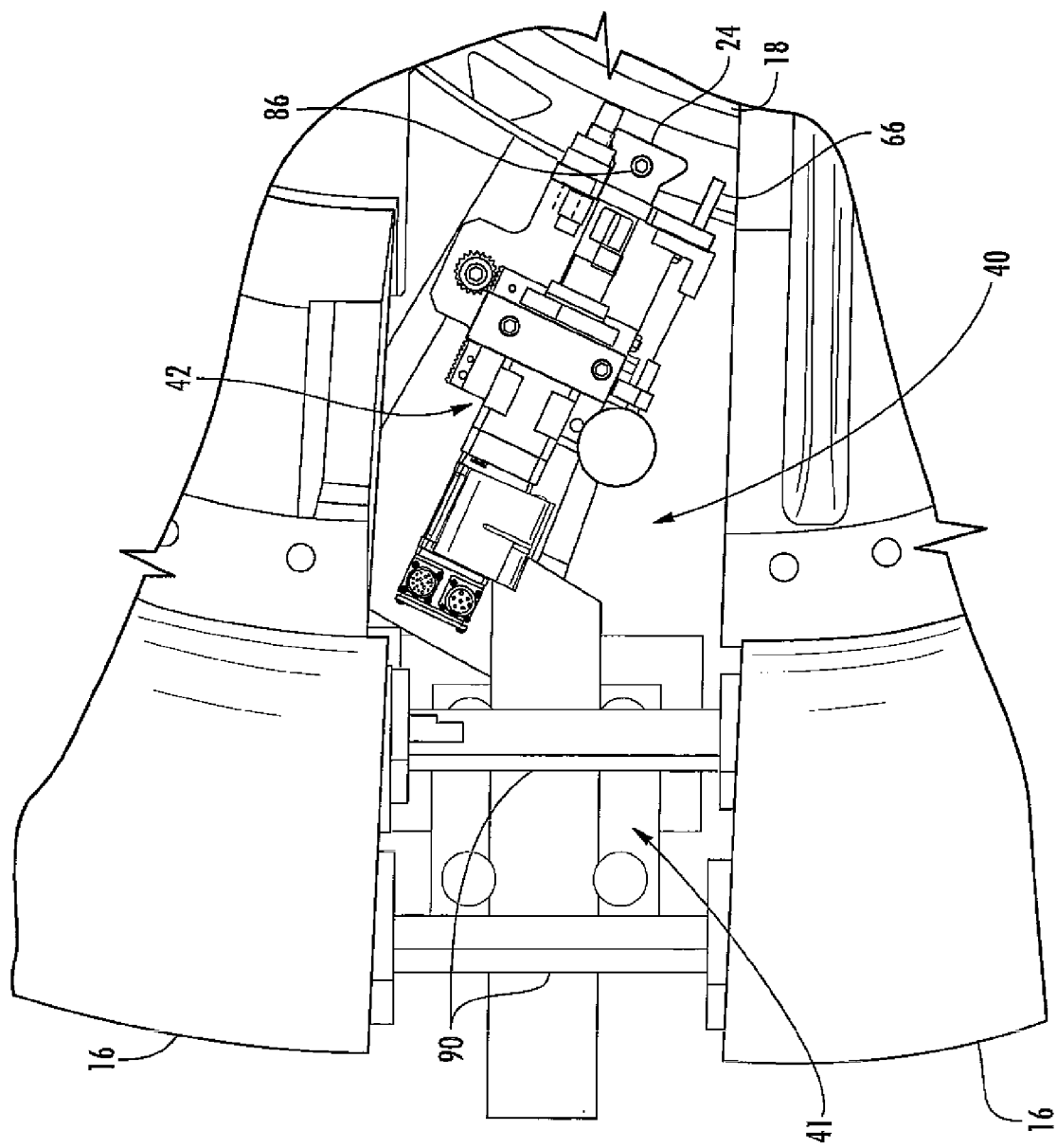
FIG. 4 is an axial view of a system for modifying a rotor according to one embodiment of the present invention.

FIG. 4 provides an axial view of a system 40 for modifying the rotor 18 according to an embodiment of the present invention. The system 40 generally comprises an assembly 41 that locates or positions a drill 42 on the rotor 18 in the radial space previously occupied by the removed blade 14, allowing the modification to be performed without requiring complete removal of the casing 16 or any walls or other structures surrounding the rotor 18.

Figure 5:
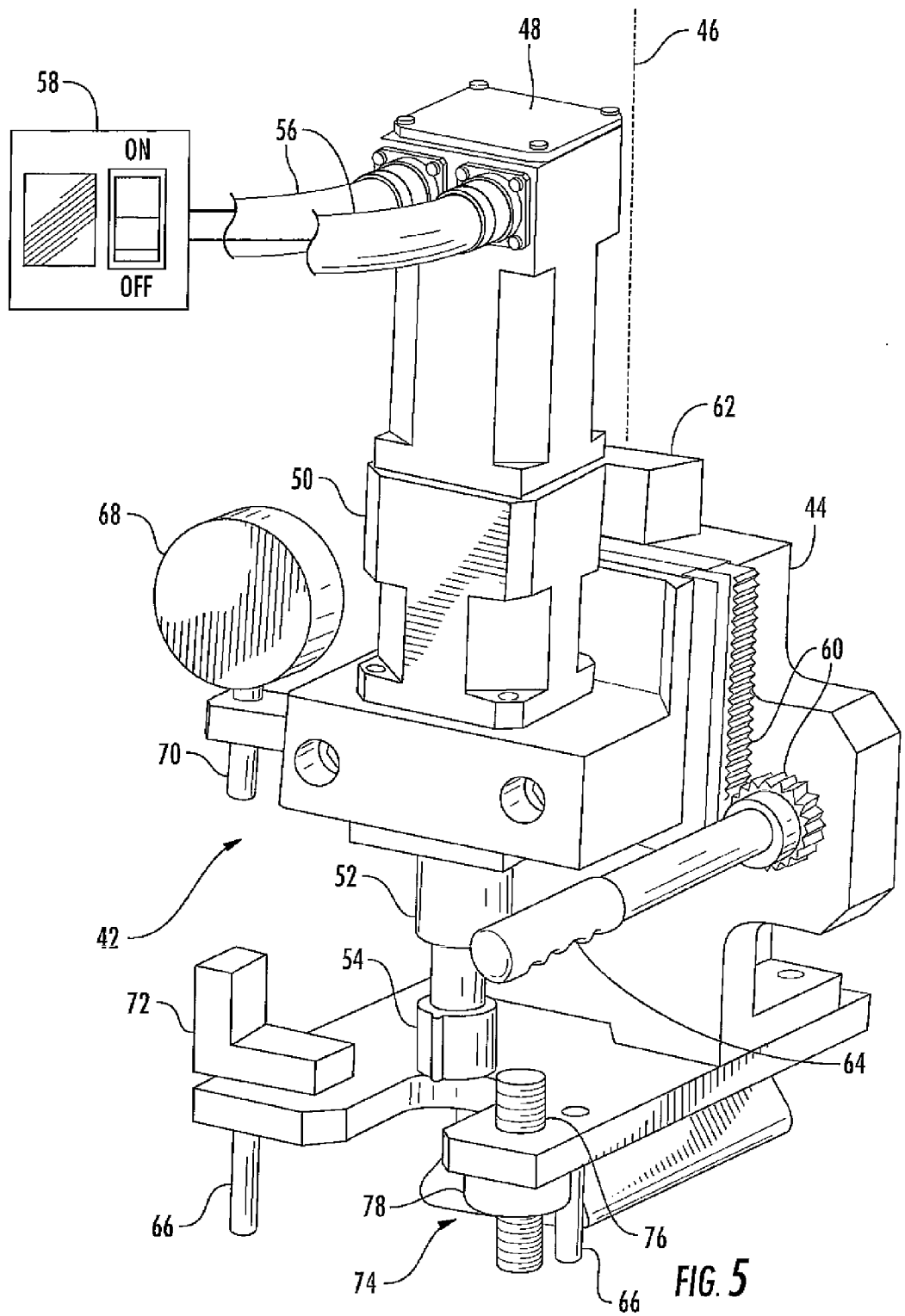
FIG. 5 is a perspective view of the drill shown in FIG. 4 according to one embodiment of the present invention.
Figure 6:
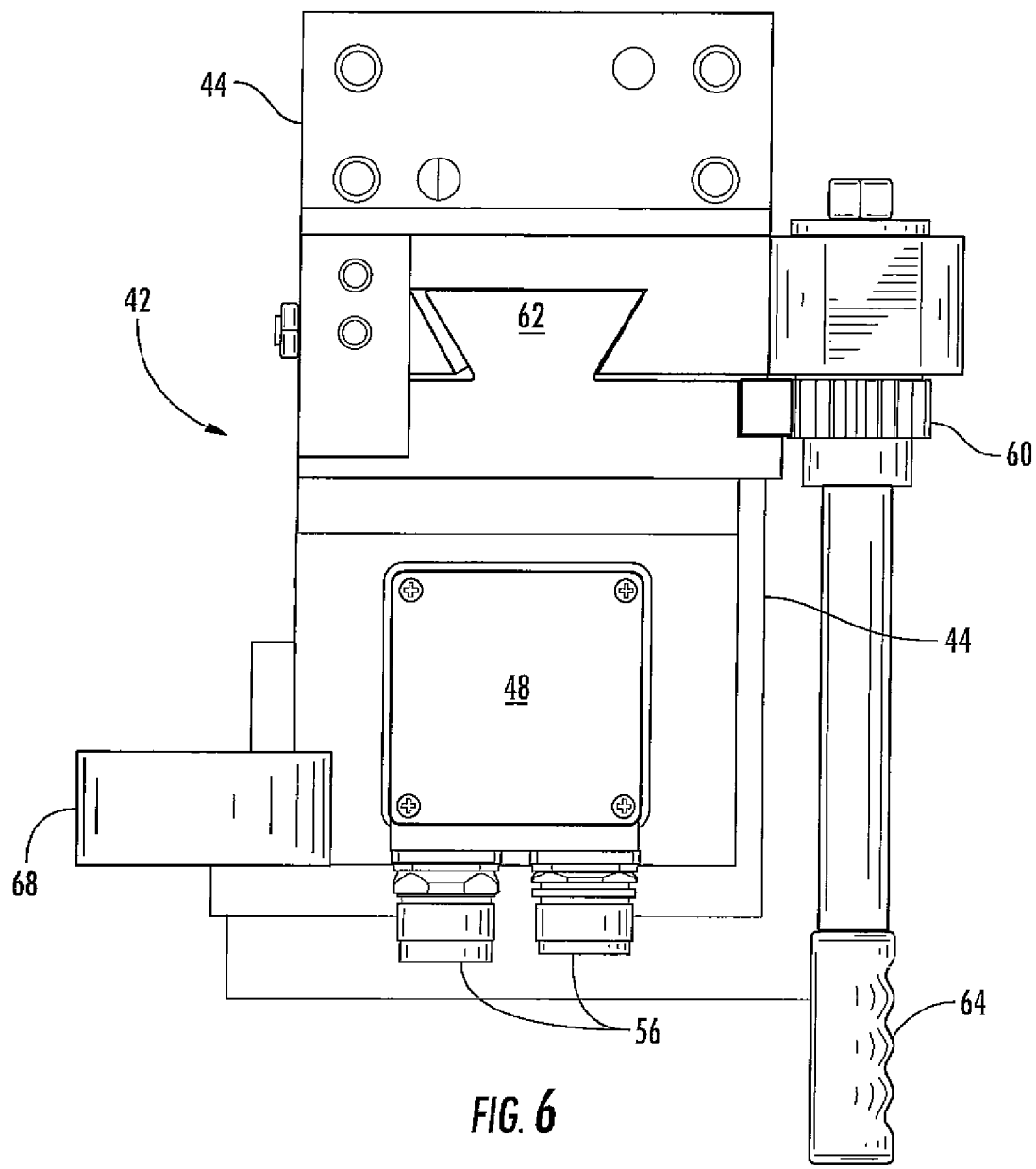
FIG. 6 is a top plan view of the drill shown in FIG. 5.

FIGS. 5-8 provide perspective, top, front, and side views, respectively, of the drill 42 shown in FIG. 4 according to an embodiment of the present invention. As shown, the drill 42 may be slidingly connected to a base 44 along a vertical axis 46. The drill 42 may comprise, for example, a pneumatic, hydraulic, or electric motor 48 connected by a gearbox 50 to a drill chuck 52 configured to retain a drill bit 54, as is known in the art. Cables 56 connected to the motor 48 may supply pneumatic, hydraulic, or electric power to operate the motor 48, and a controller 58 may allow an operator to remotely actuate the motor 48 as desired. One or more gears may provide a geared connection 60 between the drill 42 and the base 44 to provide a mechanical advantage for sliding the drill 42 along a rail 62 aligned with or parallel to the vertical axis 46. The number and orientation of gears and particular gear ratio achieved by the geared connection 60 may be easily determined by one of ordinary skill in the art without undue experimentation and is not a limitation of the present invention unless specifically recited in the claims. For example, as shown in FIGS. 5 and 6, a handle 64 may be operably connected to the geared connection 60 so that rotation of the handle 64 causes the geared connection 60 to advance or retract the drill 42 along the rail 62, thus repositioning the drill 42 vertically with respect to the base 44. Once positioned at a desired location, actuation of the motor 48 will drive the drill bit 54 to machine or bore the cavity 28 in the rotor 18, and the handle 64 may be further rotated to advance or retract the drill bit 54 in the cavity 28.

As can be seen in FIG. 3, the location and depth of the cavity 28 in the slot 24 is specifically selected to allow the insert 30 to fit in the cavity 28 without extending excessively beyond the front surface of the rotor 18. As a result, the system 40 may further include one or more components or devices that precisely position the drill 42 and/or base 44 with respect to the slot 24, that precisely measure movement of the drill 42 along the vertical axis 46, and/or that limit radial movement of the drill 42 along the vertical axis 46. For example, as shown most clearly in FIGS. 5, 7, and 8, the system 40 may include means for axially aligning the drill 42 and/or the base 44 with respect to the slot 24. The means for axially aligning the drill 42 and/or the base 44 with respect to the slot 24 may comprise, for example, one or more projections or alignment tabs 66 that extend radially from the drill 42 and/or base 44. In this manner, the one or more projections may contact with the front face of the rotor 18 to axially align the drill 42 and/or base 44 with respect to the slot 24. Other suitable structures for performing the function of axially aligning the drill 42 and/or base 44 with respect to the slot 24 may comprise one or more detents, measurement strips, straight edges, pins, or similar devices attached to the drill 42 and/or base 44.

Figure 7:
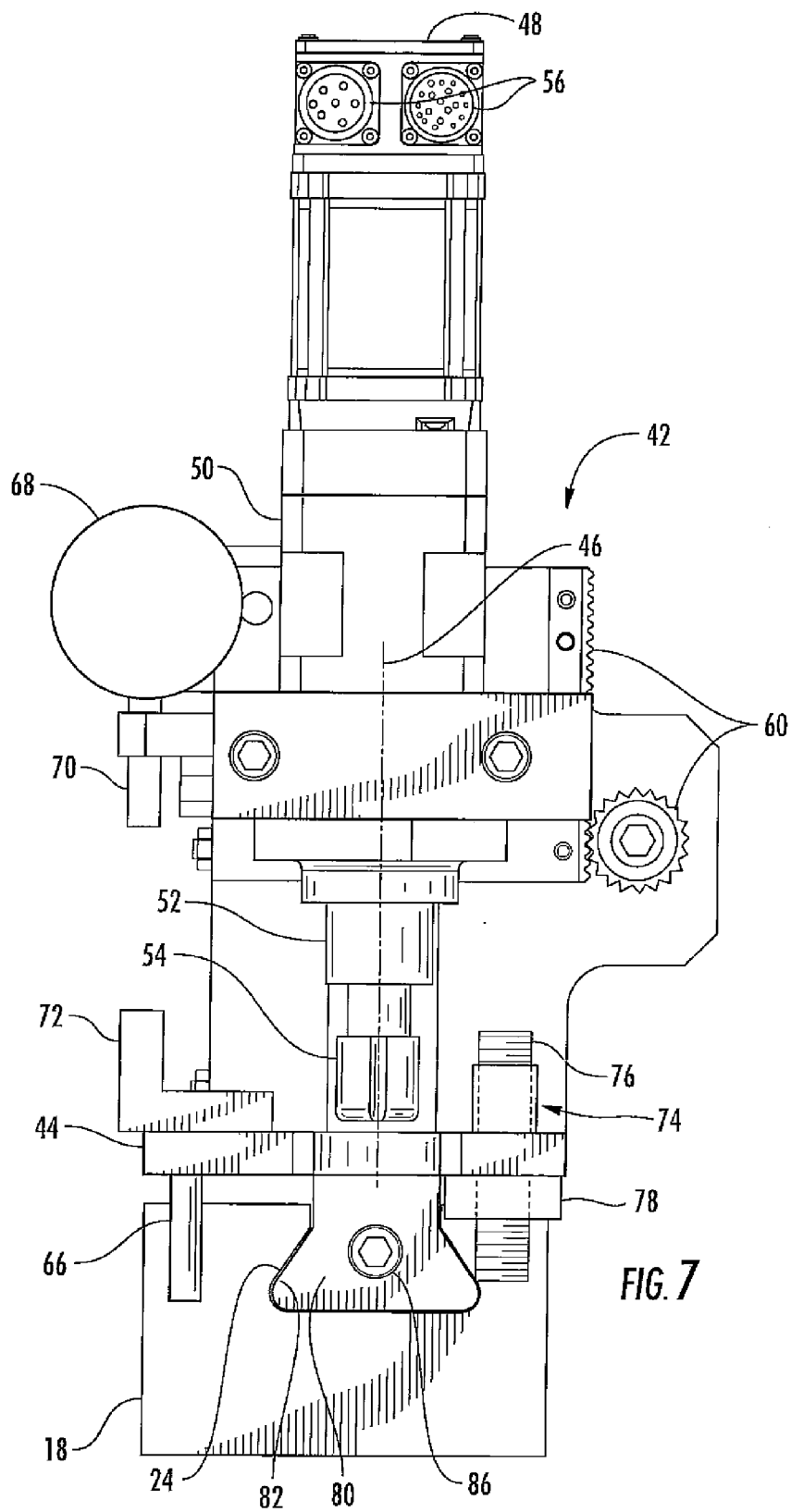
FIG. 7 front plan view of the drill shown in FIG. 5.

Alternately or in addition, the system 40 may include means for measuring movement of the drill 42 along the vertical axis 46. The means for measuring movement of the drill 42 along the vertical axis 46 may comprise any sensor that measures radial movement of the drill 42 along the vertical axis 46. For example, as shown in FIGS. 5-7, the means for measuring movement of the drill 42 along the vertical axis 46 may comprise a micrometer 68 connected to the drill 42 so that the micrometer 68 moves radially with the drill 42 as the drill 42 slides along the vertical axis 46. The micrometer 68 may include a retractable plunger 70 configured to contact a reference plate 72 so that the micrometer 68 may measure movement of the retractable plunger 70 as the drill 42 moves along the vertical axis 46. In alternate embodiments, the micrometer 68 or other sensor may be connected to the base 44 or other stationary component with respect to the drill 42 to measure radial movement of the drill 42 along the vertical axis 46.

In still further embodiments, the system 40 may include means for limiting movement of the drill 42 along the vertical axis 46. For example, as shown most clearly in FIGS. 5 and 7, a mechanical stop 74 between the drill 42 and the base 44 physically limits vertical movement of the drill 42 with respect to the base 44 and thus along the vertical axis 46. The mechanical stop 74 may comprise, for example, a stud 76 in threaded engagement with the base 44 so that the height of the stud 76 relative to the base 44 may be adjusted. The mechanical stop 74 may further include a lock 78, such as a bolt, nut, or ring, configured to engage the stud 76 and prevent the stud 76 from inadvertent movement. Additional suitable structures for limiting movement of the drill 42 along the vertical axis 46 may include, for example a detent, notch, or other mechanical device located on the geared connection 60 and/or rail 62 that limits radial movement of the drill 42 along the vertical axis 46.

Figure 8:
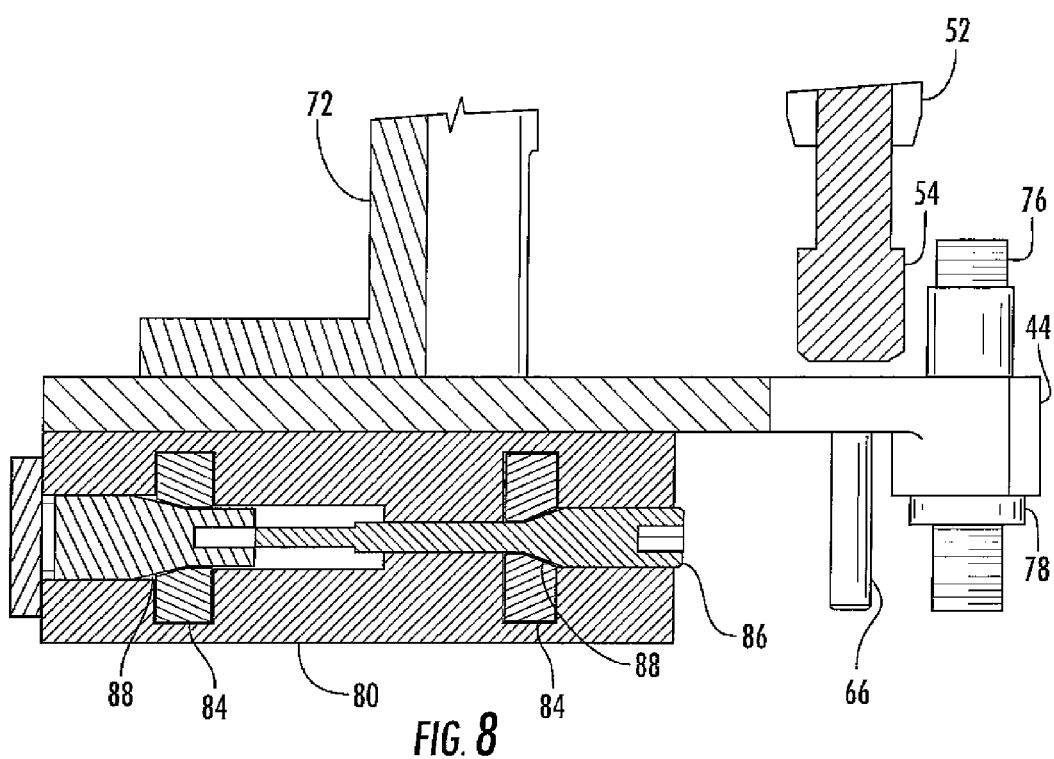
FIG. 8 is side view of a portion of the drill shown in FIG. 5.

As shown most clearly in FIGS. 7 and 8, the system 40 may further include means for aligning the drill 42, base 44, and/or vertical axis 46 above or radially outward from the slot 24. In the particular embodiment shown in FIGS. 7 and 8, the means for aligning the drill 42, base 44, and/or vertical axis 46 above the slot 24 comprises a clamp 80 connected to the drill 42 and/or base 44 and that fits inside the slot 24. An outer perimeter 82 of the clamp 80 may approximately conform to the interior surface of the slot 24 so that when the clamp 80 is axially slid into the slot 24, at least a portion of the clamp 80 engages with the interior surface of the slot 24 to hold the drill 42, base 44, and/or vertical axis 46 above the slot 24. The clamp 80 may additionally include, for example, one or more projections 84 in threaded engagement with a set screw 86. Rotation of the set screw 86 may force the one or more projections 84 against an inclined surface 88 inside the clamp 80 to extend the projections 84 beyond the outer perimeter 82 of the clamp 80 to further bind the clamp 80 to the slot 24, thus preventing the system 40 from inadvertently moving while the drill 42 is operating. Additional suitable structures for aligning the drill 42, base 44, and/or vertical axis 46 above the slot 24 may include, for example, a vice, spanner, jack, or other equivalent mechanical device connected to at least one of the drill 42 or base 44 that may fixedly connect the system 40 to the slot 24.

Figure 9:
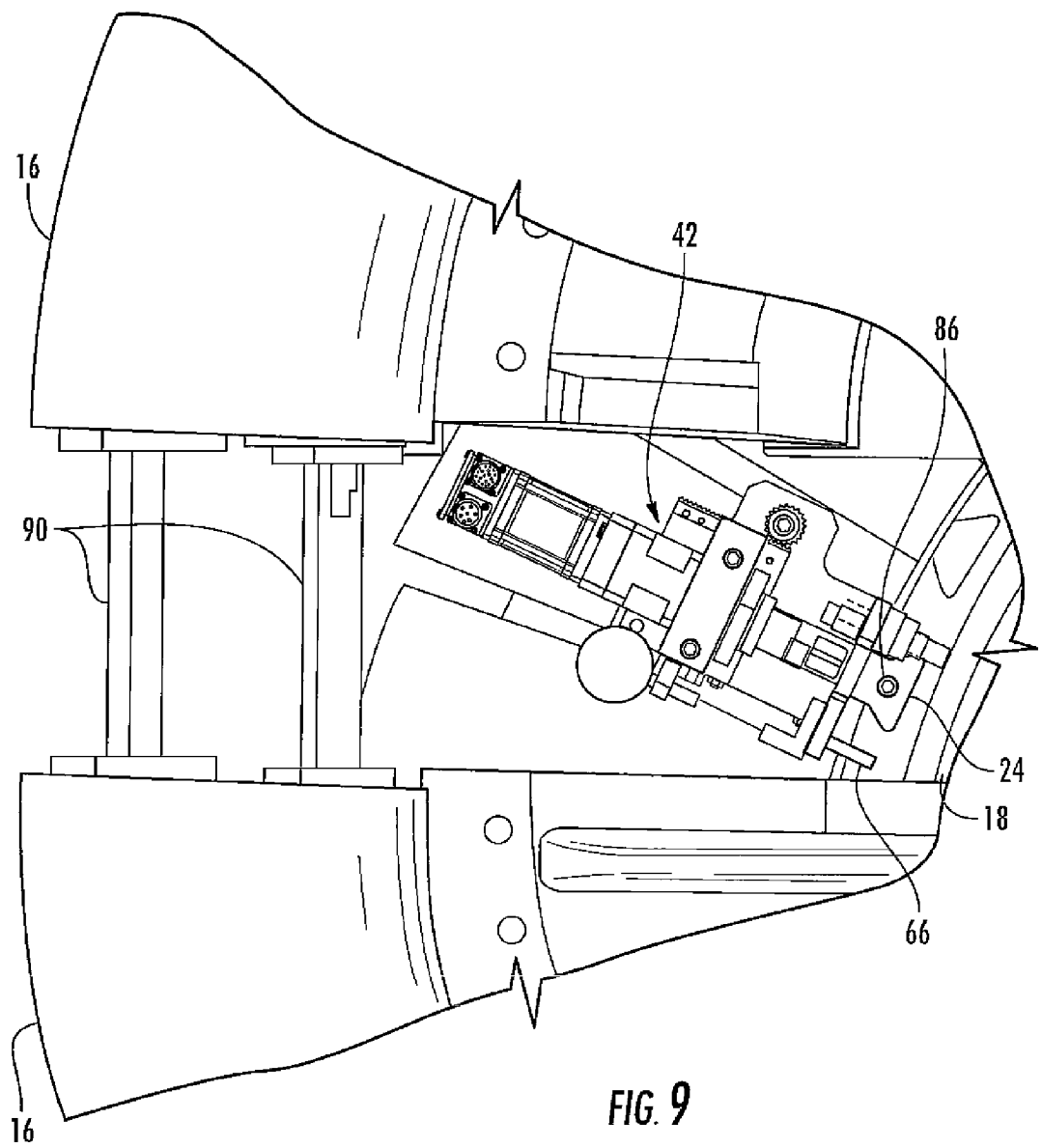
FIG. 9 is an axial view of the drill shown in FIG. 5 being used to modify the rotor of the exemplary compressor shown in FIG. 1.
Figure 10:
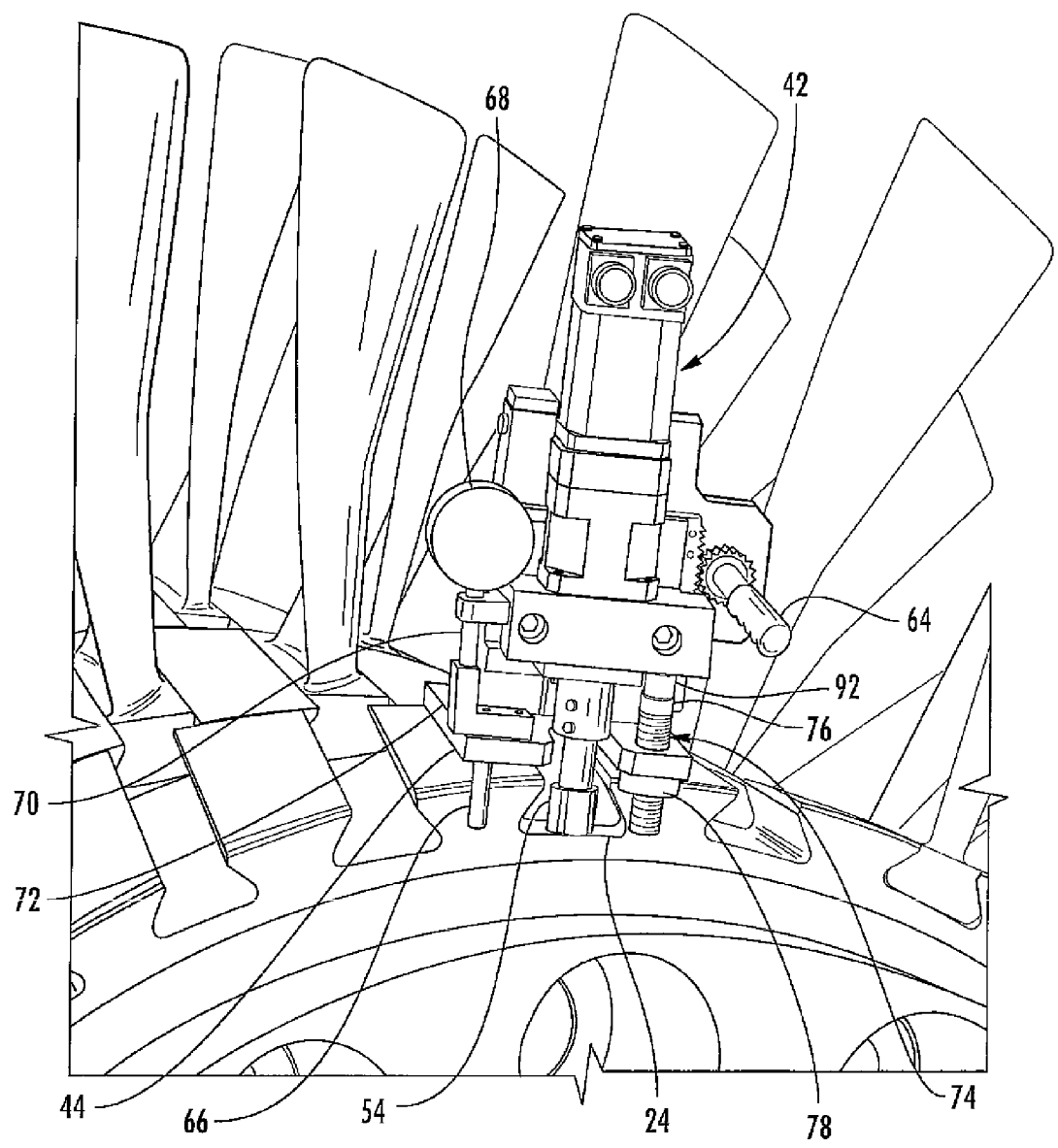
FIG. 10 is a perspective view of the drill shown in FIG. 5 mounted on the rotor.
Figure 11:
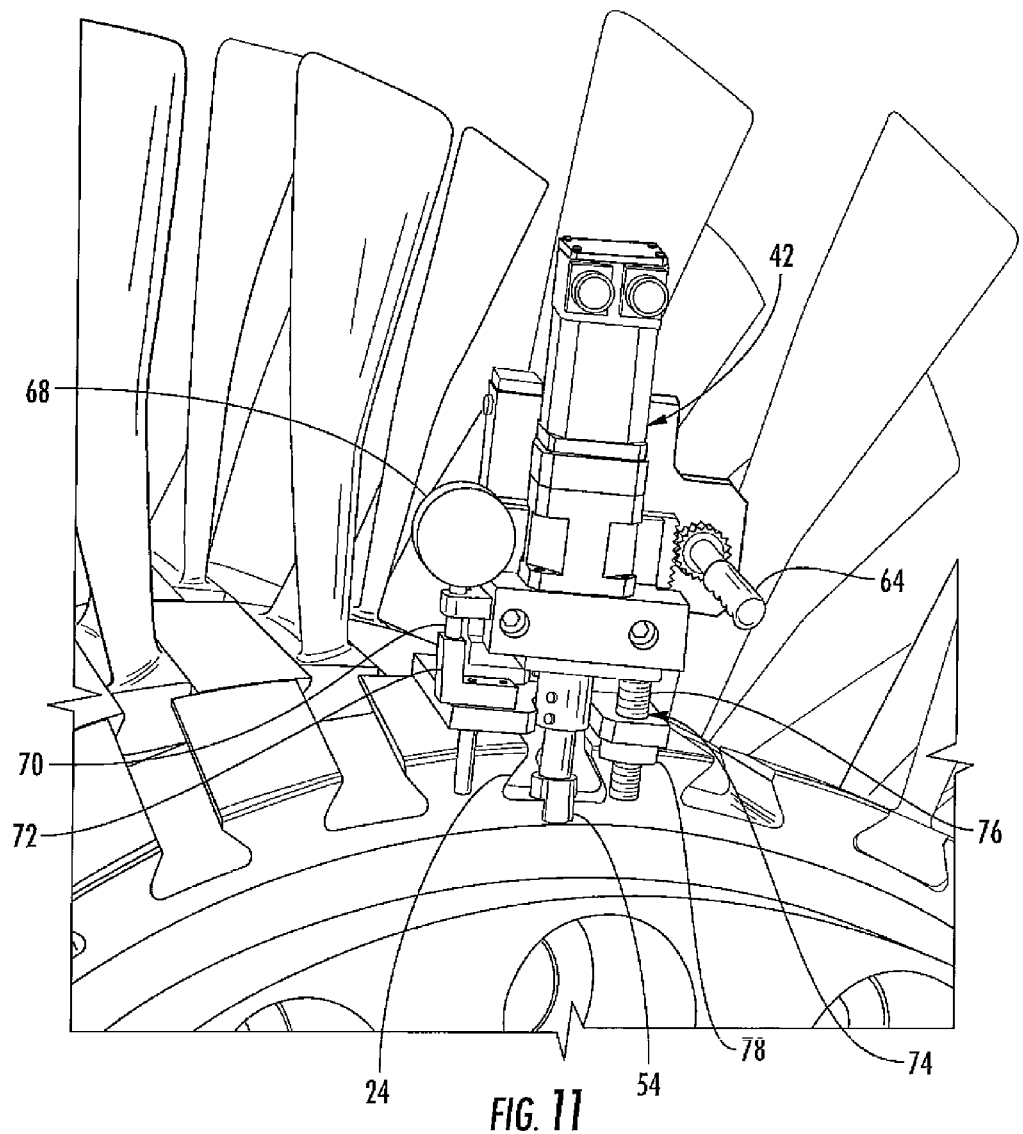
FIG. 11 is a perspective view of the drill shown in FIG. 5 modifying the rotor.

FIGS. 9-11 illustrate the drill 42 shown in FIGS. 5-8 being used to modify the rotor 18 of the exemplary compressor 10 shown in FIG. 1. As shown in FIG. 9, the casing 16 has been unbolted, and stationary jacks 90 have been installed between the sections of the casing 16 to create an opening in the casing 16 of approximately 18-24 inches. This opening is large enough to allow insertion of the drill 42 through the opening without requiring complete removal of the casing 16 or adjacent structures. The rotating blades 14 in the first stage have been removed, and the drill 42 has been located above or proximate to the slot 24 being modified. The clamp 80 is aligned with the slot 24 being modified, and the drill 42 is slid axially rearward, causing the clamp 80 to slide rearward inside the slot 24 until the alignment tabs 66 abut the front surface of the rotor 18. Once the alignment tabs 66 abut the front surface of the rotor 18, the drill 42 is axially aligned with the slot 24 to machine the cavity 28 in the desired position, and the outer surface 82 of the clamp 80 engages with the interior surface of the slot 24 to hold the drill 42 in place. The set screw 86, if present, may be rotated to further tighten the clamp 80 inside the slot 24. For example, as previously discussed with respect to FIG. 8, rotation of the set screw 86 may force the projections 84 against the inclined surface 88 inside the clamp 80 to extend the projections 84 beyond the outer perimeter 82 of the clamp 80 to further bind the clamp 80 to the slot 24.

As shown in FIG. 10, the handle 64 has been rotated to move the drill 42 radially inward along the vertical axis 46 until the drill bit 54 contacts the inner surface of the slot 24 at the desired location of the cavity 28. A precision block 92 having the same thickness as the insert 30 may be placed on top of the mechanical stop 74, and the stud 76 may be rotated until the precision block 92 abuts the drill 42. The precision block 92 may then be removed from the mechanical stop 74, and the lock 78 may be applied to the stud 76 so that the resulting distance between the drill 42 and the top of the stud 76 equals the desired depth of the cavity 28 to be machined into the slot 24. With the drill bit 54 in contact with the inner surface of the slot 24, the micrometer 68 may be zeroed to allow accurate measurement of the radial movement of the drill 42 along the vertical axis 46.

In FIG. 11, the drill 42 has been actuated, and the handle 64 has been rotated to advance the drill 42 radially inward along the vertical axis 46. As a result, the drill bit 54 machines the cavity 28 into the bottom of the slot 24. The micrometer 68 provides a continuous indication of the depth of the drill bit 54 in the slot 24, and the mechanical stop 74 ensures that the desired depth of the cavity 28 is not exceeded. When the desired depth of the cavity 28 is reached, as indicated by the micrometer 68 or contact with the mechanical stop 74, the handle 64 may be rotated in the opposite direction to withdraw the drill 42 radially outward along the vertical axis 46. The set screw 86, if present, may then be rotated to loosen the clamp 80 inside the slot 24. The drill 42 may then be slid axially forward until the clamp 80 clears the slot 24, and the drove 42 may be located proximate to or above the next slot 24 to be machined.

Figure 12:
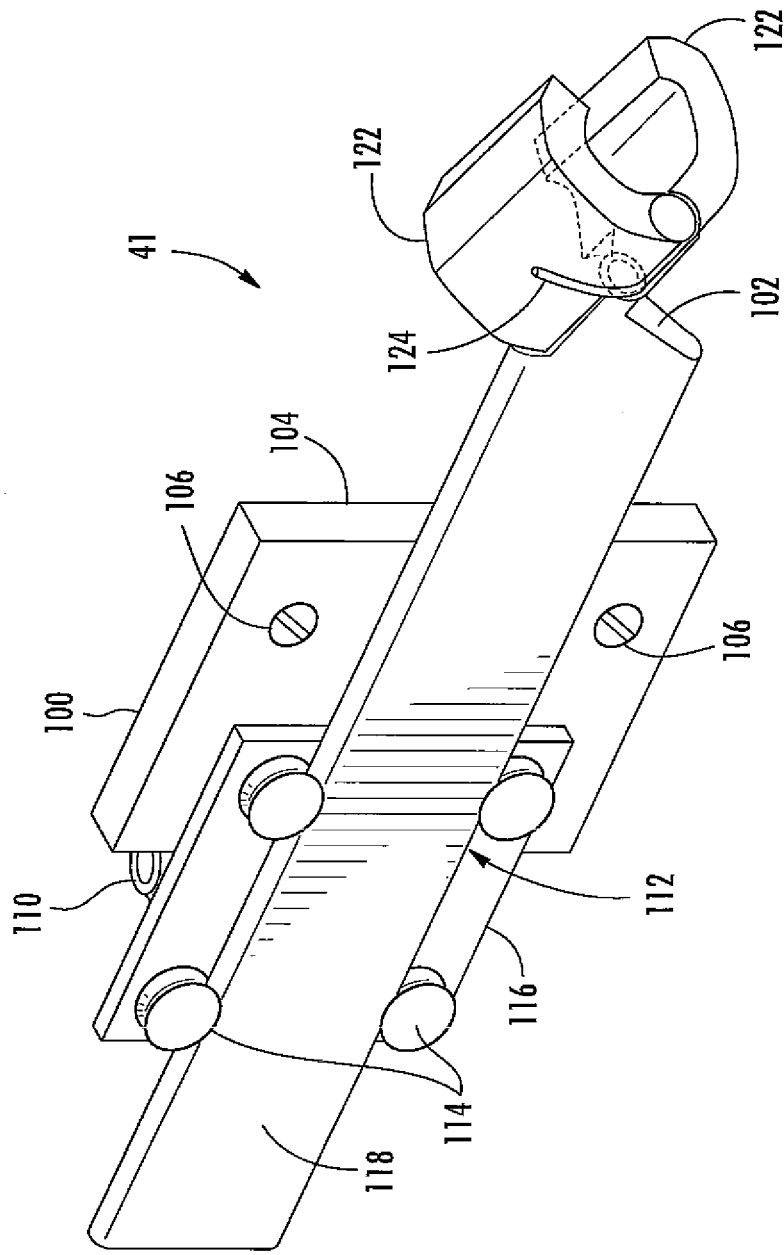
FIG. 12 is a perspective view of the assembly shown in FIG. 4 according to one embodiment of the present invention.

FIG. 12 provides a perspective view of the assembly 41 shown in FIG. 4. As shown, the assembly 41 generally comprises means for supporting the drill 42 from a stationary platform adjacent to the rotor 18. The stationary platform may comprise any portable or permanently mounted stand, fixture, wall, or other static object adjacent to the rotor 18. For example, as shown in FIGS. 4 and 13-15, the casing 16 surrounding the compressor 10 may serve as the stationary platform. The structure for the means for supporting the drill 42 may comprise an arm, lever, bar, or other suitable configuration for attaching to the stationary platform and supporting the weight of the drill 42. In the particular embodiment shown in FIGS. 4 and 13-15, the means for supporting the drill 42 comprises a coupling 100, such as a plate or a mounting bracket, connected to the casing 16 adjacent to the rotor 18. The coupling 100 may be a unitary structure or multiple structures that extend from the casing 16 to the location proximate to the slot 24 being modified. For example, the coupling 100 may include a first end 102 connected to the drill 42 and a second end 104 connected to the casing 16 or stationary platform. The coupling 100 may be fixedly connected to the casing 16 or stationary platform, or as shown in FIG. 12, one or more screws 106, bolts, or other attachment devices known to one of ordinary skill in the art may be used to releasably connect the coupling 100 to the casing 16 or stationary platform.

As shown in FIGS. 12-15, the assembly 41 may include one or more pivotal connections 108 between the drill 42 and the coupling 100 or the means for supporting the drill 42. For example, the pivotal connection 108 may comprise a rotary joint 110 or bearing between the coupling 100 and the drill 42 that allows at least a portion of the coupling 100 to rotate with respect to the casing 16. Alternately, or in addition, the assembly 41 may include one or more sliding connections 112 between the drill 42 and the coupling 100 or the means for supporting the drill 42. The sliding connection 112 may comprise, for example, a plurality of rollers 114 connected to a plate 116 that allow an arm 118 to alternately slide toward or away from the rotor 18. In this manner, the pivotal connection 108 and/or the sliding connection 112 may provide an articulated connection between the drill 42 and the coupling 100 or the means supporting the drill 42. In particular embodiments, the assembly 41 may further include a biasing member 120 that biases at least a portion of the coupling 100 away from the rotor 18. For example, as shown most clearly in FIGS. 13 and 14, the biasing member 120 may comprise a spring connected to the coupling 100 and/or pivotal connection 108 to bias at least a portion of the coupling 100 away from the rotor 18. Alternately, or in addition, the biasing member 120 may comprise a spring connected to the sliding connection 112 to bias at least a portion of the sliding connection 112 away from the rotor 18. In this manner, the coupling 100, pivotal connection 108, and/or sliding connection 112 may extend inside the casing 16 to the rotor 18, and when not in use, the biasing member 120 may move at least a portion of the coupling 100, pivotal connection 108, and/or sliding connection 112 away from the rotor 18 and out of the workspace.

As shown in FIGS. 12-15, the assembly 41 may further include means for releasably connecting to the drill 42. The means for releasably connecting to the drill 42 may comprise any suitable structure known to one of ordinary skill in the art for releasably connecting one object to another. For example, the means for releasably connecting to the drill 42 may comprise a vice grip, a threaded connection, an elastic cord, a spring, or a magnetic coupling. As shown in the particular embodiment illustrated in FIGS. 12-15, the means for releasably connecting to the drill 42 may comprise retractable jaws 122 that may close or open to alternately grasp or release the drill 42. In particular embodiments, the means for releasably connecting to the drill 42 may further include a biasing member 124 that biases the jaws 122 closed or open to assist in grasping or releasing the drill 42. As shown most clearly in FIG. 12, for example, the biasing member 124 may comprise a spring connecting the jaws 122 to bias the jaws 122 either open or closed.

Figure 13:
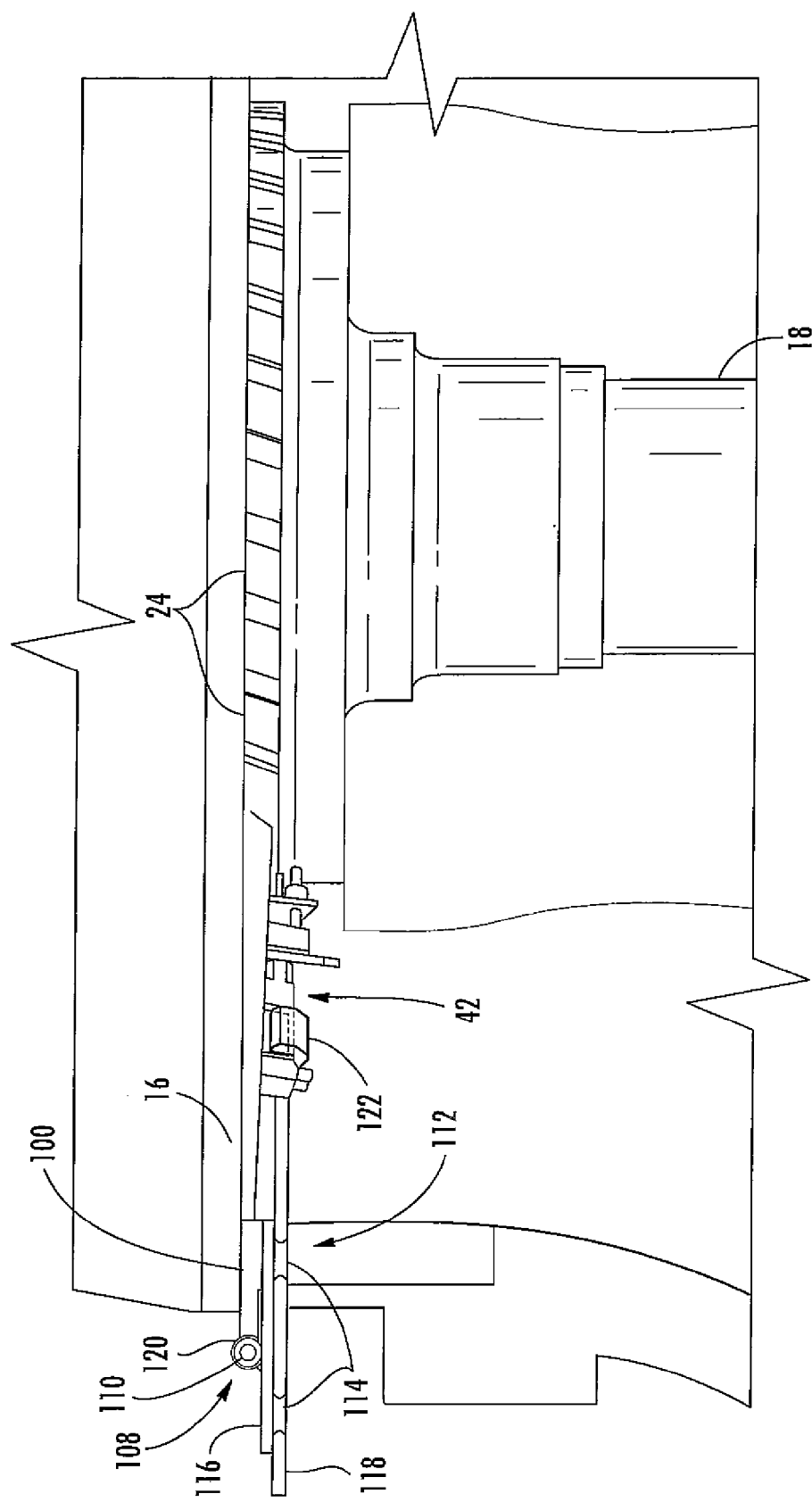
FIG. 13 is a top view of the assembly installed and supporting the drill mounted on the rotor.
Figure 14:
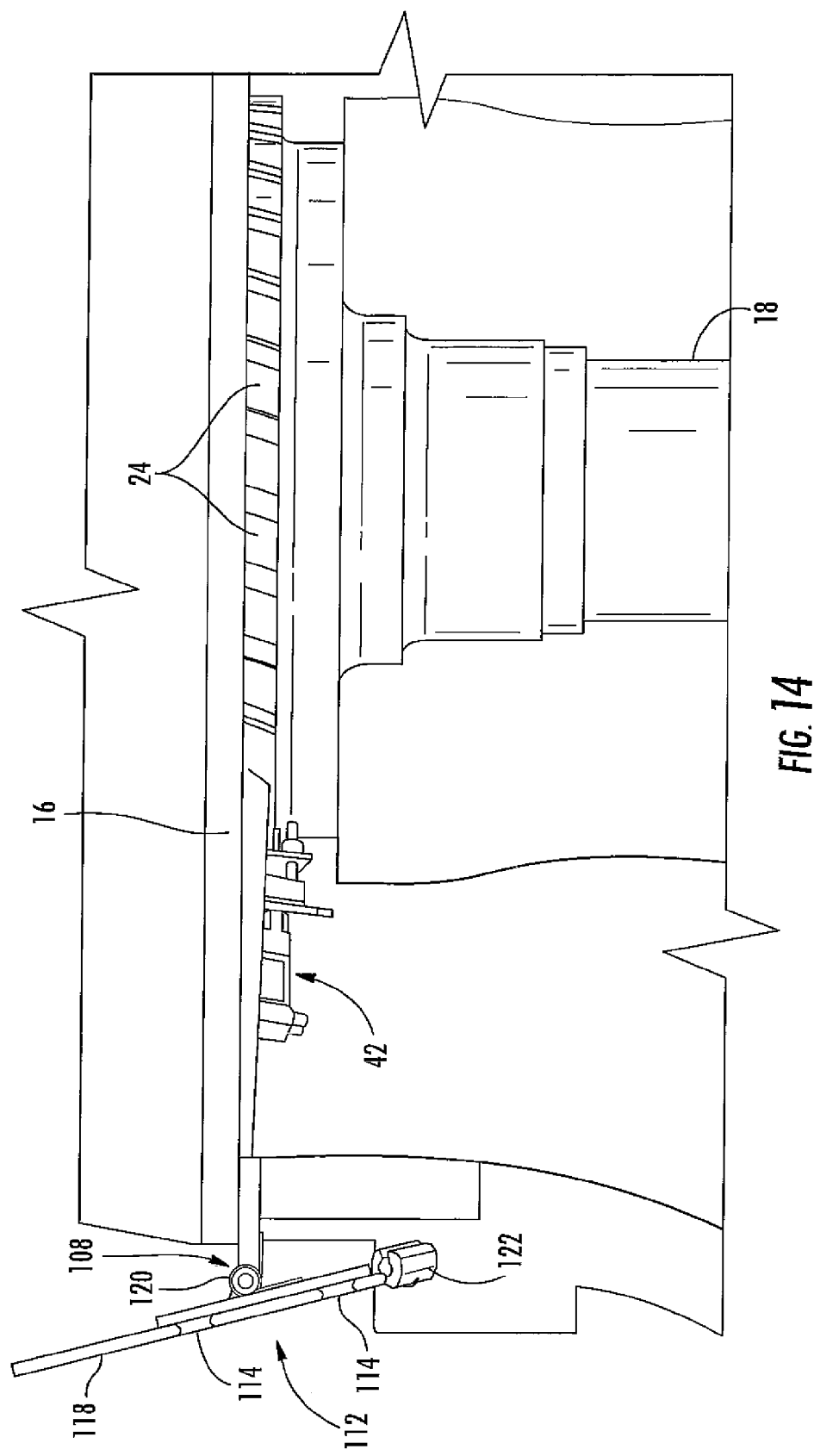
FIG. 14 is a top view of the assembly in a retracted position.
Figure 15:
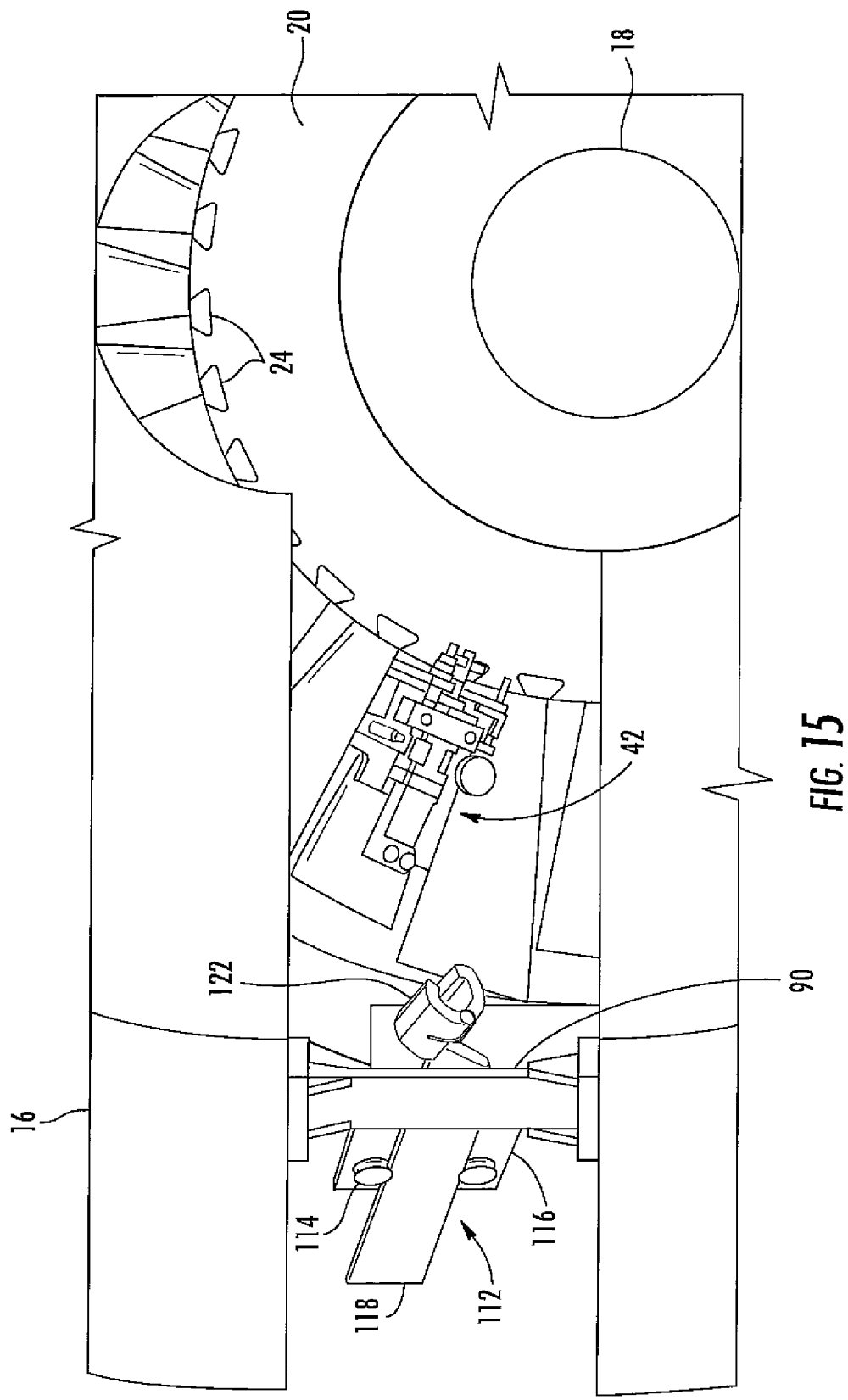
FIG. 15 is an axial view of the assembly in the retracted position.

FIGS. 13-15 provide various axial and top views of the assembly 41 shown in FIG. 12 in extended and retracted positions as the system 40 is used to modify the slot 24 in the rotor 18. Specifically, FIG. 13 shows the coupling 100 connected to the casing 16 and the arm 118 of the sliding connection 112 extended through the opening in the casing 16 to the slot 24 being modified. The retractable jaws 122 releasably connect to the drill 42 so that the assembly 41 may locate the drill 42 proximate to the slot 24 being modified. Once the drill 42 has been properly positioned, the clamp 80 connected to the drill 42 may be inserted into the slot 24 so that the clamp 80 engages with the interior surface of the slot 24. The retractable jaws 122 may release the drill 42 so that the assembly 41 may be retracted away from the rotor 18, as shown in FIGS. 14 and 15, and the drill 42 may be operated to create the cavity 28 in the slot 24, as previously described with respect to FIGS. 9-12. When the modification to the slot 24 is complete, the assembly 41 may again be extended toward the drill 42, and the jaws 122 may again connect to the drill 42. The clamp 80 may be removed from the completed slot 24, and the assembly 41 may be partially or completely retracted as the rotor 18 is indexed to the next position, and the process repeats for each slot 24 needing modification.

The system 40 described and illustrated with respect to FIGS. 4-15 provides one or more benefits over the existing technology used to modify rotors. For example, the system 40 contemplated within the scope of the present invention is considerably smaller and lighter than the existing technology. Specifically, the drill 42 and the clamp 80 are designed to be located or aligned with the same slot 24, allowing the system 40 to fit within the width created by the removal of a single rotating blade 14. In addition, the assembly 41 for locating or positioning the drill 42 allows the drill 42 to be more easily manipulated within the tight confines around the rotor 18. As a result, the system 40 does not require the complete removal of the casing 16 and/or adjacent structures, installation of scaffolding, or the use of an external crane to move the drill 42 between slots 24, all of which result in substantial savings in preparing the rotor 18 for modification and restoring the rotor 18 to service upon completion of the modification.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for modifying a slot in a rotor, comprising:
    a. installing stationary jacks between sections of a casing at least partially surrounding the rotor to create an opening and then connecting a coupling to the rotor;
    b. connecting a drill to said coupling;
    c. locating said drill proximate to the slot;
    d. inserting a clamp into the slot;
    e. engaging said clamp with an interior surface of the slot; and
    f. operating said drill to create a cavity in the slot.

2. The method as in claim 1, further comprising releasably connecting said coupling to said casing.

3. The method as in claim 1, further comprising biasing at least a portion of said coupling away from the rotor.

4. The method as in claim 1, further comprising sliding said drill toward the rotor.

5. The method as in claim 1, further comprising pivoting said drill away from the rotor.

6. The method as in claim 1, further comprising releasably clamping said drill to said coupling.

7. A method for modifying a slot in a rotor, comprising:
   a. installing stationary jacks between sections of a casing at least partially surrounding the rotor to create an opening and then supporting a drill from the casing adjacent to the rotor;
   b. extending said drill toward the slot in the rotor;
   c. clamping at least a portion of a base inside the slot;
   d. sliding said drill along said base into the slot;
   e. penetrating the slot with said drill;
   f. sliding said drill along said base out of the slot; and
   g. retracting said drill away from the slot in the rotor.

8. The method as in claim 7, further comprising pivotally connecting said drill to the casing adjacent to the rotor.

9. The method as in claim 7, further comprising biasing said drill with respect to the casing adjacent to the rotor.

* * * * *